April 13, 1965

G. A. ARO 3,178,080

MEASURING AND DISPENSING CANNISTER

Filed Aug. 29, 1963

INVENTOR.
GEORGE A. ARO
BY David H. Kilgore
ATTORNEY

[United States Patent Office — 3,178,080 — Patented Apr. 13, 1965]

3,178,080
MEASURING AND DISPENSING CANNISTER
George A. Aro, 2925 18th Ave. N., Minneapolis, Minn.
Filed Aug. 29, 1963, Ser. No. 305,272
3 Claims. (Cl. 222—430)

This invention relates broadly to devices for measuring, and dispensing the contents of a receptacle; and more particularly to a device for storing, measuring, and selectively dispensing predetermined quantities of powdered or granular materials contained in said receptacle.

The principal object of this invention is to provide a measuring and dispensing device mounted within a storage receptacle of arbitrary size whereby predetermined quantities of powdered or granular materials may selectively be dispensed from said receptacle.

A further object of this invention is to provide a measuring and dispensing device for selectively measuring and dispensing the powdered or granular contents of a storage receptacle which comprises a minimum number of moving parts and which is relatively simple and inexpensive to manufacture.

A still further object of this invention is to provide a measuring and dispensing device for selectively dispensing therefrom, given, predetermined quantities of a powdered or granular material such as ground coffee for discharge into a coffee pot or; instant coffee or tea directly into a cup.

These and other objects of the invention will become apparent from the following specification and claims when taken in conjunction with the accompanying drawing which forms a part of this application, and in which drawing, like characters indicate like parts throughout the several views.

To the above end, generally stated, the invention consists of the following devices and combination of devices hereinafter described and defined in the claims.

Referring to the drawing.

The numeral 5 is directed to the subject invention as an entirety and comprises a cylindrical shaped receptacle 6 for retaining a quantity of powdered or granular material, not shown. This receptacle 6 is provided with a cover member 7, a handle 8, and a restricted discharge port formed in the bottom portion thereof, as will presently appear.

Figure 1:
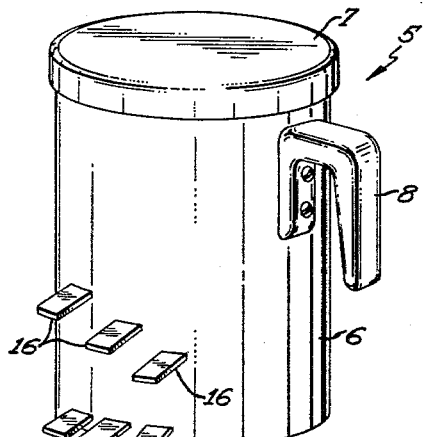
FIG. 1 is a perspective view of the invention as an entirety.
Figure 3:
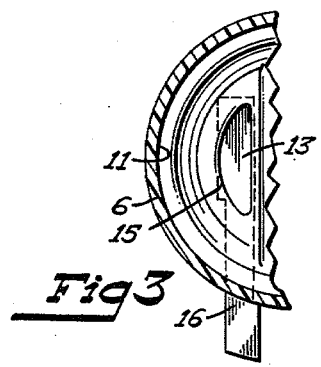
FIG. 3 is a fragmentary view illustrating one element of the dispensing apparatus partly in section, taken on the line 3—3 of FIG. 2.
Figure 4:
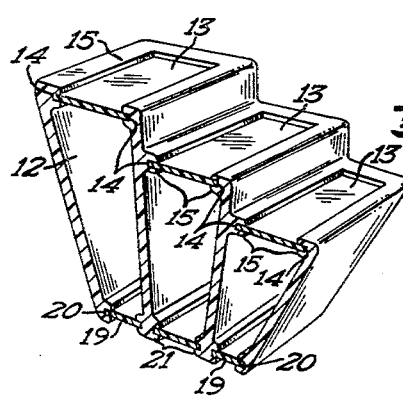
FIG. 4 is a view of the measuring and dispensing apparatus some parts being sectioned and illustrating a modified form of the invention having a substantially rectangular configuration.
Figure 2:
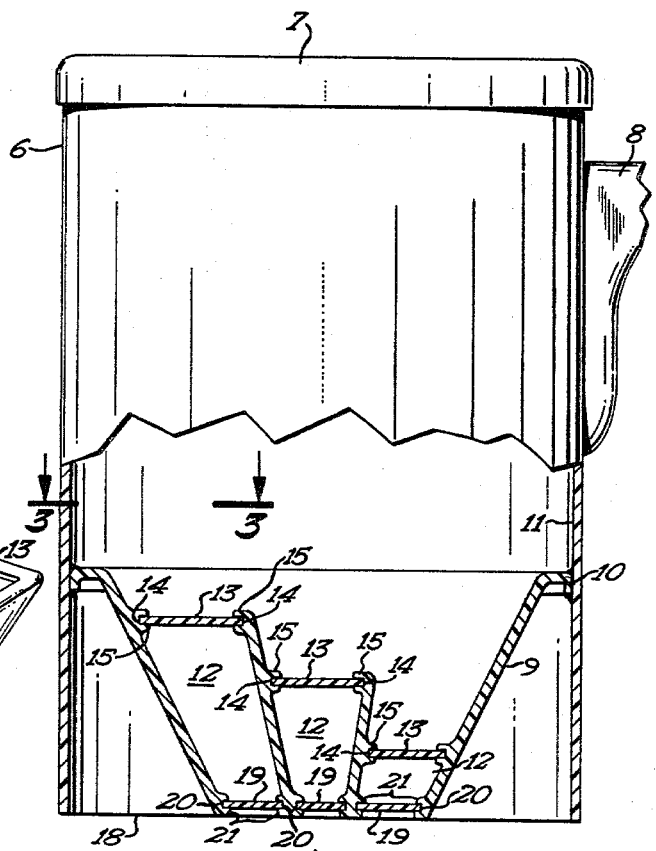
FIG. 2 is a side elevational view of the same, some parts being broken away and sectioned.

It will be understood that while a round or cylindrical shaped receptacle 6 is shown herein as being preferable to other shapes, it is also possible to embody the instant invention in an oblong or square shaped receptacle 6 as suggested by FIG. 4.

The measuring and dispensing means is removably disposed to facilitate cleaning in the bottom of the receptacle 6, but is, of course, stationary when the same is in use and is constructed and dimensioned to closely fit the inside dimensions of sides of the receptacle substantially above the bottom portion thereof.

The said measuring and dispensing means comprises an upwardly and outwardly diverging conical shell 9 having an outwardly and downwardly projecting peripheral flange 10, said flange being dimensioned to engage the inner walls 11 of the receptacle 6 with a close working fit whereby said measuring and dispensing means is held in a stationary position.

Formed integral with the side portions of the conical shell 9 and centrally disposed therebetween in stepped relation thereto, are a plurality of independent substantially oblong or cone shaped chambers 12, three as shown, each of said chambers being dimensioned to retain, when filled, a given predetermined quantity of material to be dispensed. For example, said chambers may respectively contain the proper amount of ground coffee for three, five, and eight cups of brewed fluid coffee.

The upper end portion of the chambers 12 are in communication with the interior of the receptacle 6 and are normally held closed by means of a horizontally disposed, manually manipulated slide member 13 in the upper end portion of each of said chambers 12. These slide members work in a groove 14 formed in a boss 15 in the inner walls of each of said chambers 12 and extend outwardly of the side wall portions of the receptacle 6 in the form of a finger tab 16 affording means for manual manipulation thereof.

The lower end portion of each of said chambers 12 is in common communication with a central discharge port 17 formed in the bottom portion 18 of the receptacle 6. The said lower end portion of these chambers 12 are also each normally closed by a horizontally disposed slide member 19 which also works in a lower groove 20 formed in a lower boss 21. These lower slide members 19 also project outwardly of the receptacle 6 in the form of a finger tab 22 which affords means to manually manipulate said slide members for endwise movement to expose the respective chambers to the discharge port 17.

In making use of the instant invention it will be assumed that the upper portion of the receptacle 6 is filled with a powdered or granular material to be selectively dispensed. The upper slide members 13 are in closed position thereby supporting the supply of material in the said receptacle. Depending upon the amount of material desired, the proper upper slide member 13 is moved endwise to permit communication of the underlying chamber 12 with the receptacle 6 and its contained material. The force of gravity will cause the said material to be projected downwardly into the open exposed chamber until the same is filled at which time the slide member 13 is closed thus leaving a correct measured amount of material in said chamber.

This measured amount of material may now be dispensed into a coffee pot or the like whereby the endwise movement of the lower corresponding slide member 19, which is in communication with the common discharge port 17, formed in the bottom 18 of the receptacle 6 thereby releasing the measured quantity of material in the said chamber.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A device for storing, measuring and selectively dispensing flowable materials having in combination, an upright receptacle constituting in its upper portion a storage chamber, a measuring assembly having an upper peripheral edge fitting the inner periphery of said receptacle having a stepped top and having an exterior skirt extending from said upper end downwardly in converging fashion and terminating in a common discharge mouth disposed substantially centrally of the lower end of said receptacle, said measuring assembly having generally longitudinally extending dividing walls defining therebetween and between said walls and the peripheral wall of said assembly, a plurality of measuring compartments of different volumetric capacities, said walls varying in length to provide a stepped effect to the top of the said measuring compartments formed, a plurality of slide closure members extending transversely of said receptacle and disposed respectively near and normally covering the tops respectively of each measuring compartment, said members extending through and beyond the wall of said receptacle to provide manipulating tabs arranged in stepped fashion relative ot the bottom of said receptacle, the uppermost of said tabs indicating the measuring compartment of greatest capacity, a corresponding set of slide closure members disposed transversely of said receptacle and at substantially the same level near the bottom thereof and extending beyond said receptacle to provide manipulating tabs for releasing selectively, measured flowable material disposed in each of said measuring compartments, and said measuring compartments all communicating at their lower ends with said substantially central discharge mouth.

2. The structure set forth in claim 1 further characterized by, there being at least two of said walls interposed transversely between opposing portions of said skirt and interconnected therewith with sealed effect, said adjacent walls and the walls adjacent to said skirt having sets of opposed guides for slidably receiving the respective slide closure members and for maintaining substantially sealed relation with said respective slide closure members, then constituting the stepped level determining factors of said measuring compartments.

3. The structure set forth in claim 2 wherein said stepped measuring receptacle is bodily removable from and closely fits the lower portion of said receptacle and wherein said slide closure members are all bodily removable from the cooperating respective walls.

References Cited by the Examiner
UNITED STATES PATENTS

| | | | |
|---|---|---|---|
| 220,609 | 10/79 | Hartley | 222—430 X |
| 755,156 | 3/04 | Moore | 222—430 |
| 943,854 | 12/09 | Whitten et al. | 222—450 X |
| 2,515,735 | 7/50 | Saunders | 222—430 |

LOUIS J. DEMBO, *Primary Examiner.*